United States Patent [19]
Warner et al.

[11] Patent Number: 5,249,905
[45] Date of Patent: Oct. 5, 1993

[54] AUTOMATIC WHEEL CHOCKING APPARATUS HAVING AN IMPROVED DRIVE MECHANISM

[75] Inventors: Robert J. Warner, Mukwonago; Lester W. Paul, Port Washington, both of Wis.

[73] Assignee: Kelley Company, Inc., Milwaukee, Wis.

[21] Appl. No.: 918,680

[22] Filed: Jul. 22, 1992

[51] Int. Cl.⁵ .............................................. B65G 67/02
[52] U.S. Cl. .................... 414/401; 414/396; 414/584; 410/30
[58] Field of Search ............... 188/32; 410/30; 414/395, 396, 401, 584

[56] References Cited

U.S. PATENT DOCUMENTS

| | | | |
|---|---|---|---|
| 2,413,744 | 1/1947 | Carter | 188/32 X |
| 2,773,564 | 12/1956 | Garard, Sr. | 188/32 |
| 3,305,049 | 2/1967 | Willey | 188/32 |
| 4,676,344 | 6/1987 | Locicero | 188/32 |
| 4,915,568 | 4/1990 | West | 414/401 |
| 4,963,068 | 10/1990 | Gelder | 414/584 X |
| 4,969,792 | 11/1990 | Ellis et al. | 414/401 |

FOREIGN PATENT DOCUMENTS

3830891 4/1990 Fed. Rep. of Germany ...... 414/401

Primary Examiner—Michael S. Huppert
Assistant Examiner—Stephen T. Gordon
Attorney, Agent, or Firm—Andrus, Sceales, Starke & Sawall

[57] ABSTRACT

An automatic wheel chocking apparatus for restraining movement of a vehicle away from a loading dock during a loading operation. The apparatus comprises an elongated trough formed in the driveway that extends outwardly from the front face of the loading dock and a wheel chock is mounted in the trough for movement between a storage position, where the wheel chock is located beneath the level of a driveway, and an operative position where the chock extends upwardly above the driveway and is disposed to engage a wheel of a vehicle. The wheel chock is moved between the storage and operative positions by a drive mechanism that is located within the trough and includes a lead screw. A nut is threaded on the lead screw and is connected to the wheel chock via a rigid link. Rotation of the lead screw will move the chock between the storage and operative positions.

14 Claims, 2 Drawing Sheets

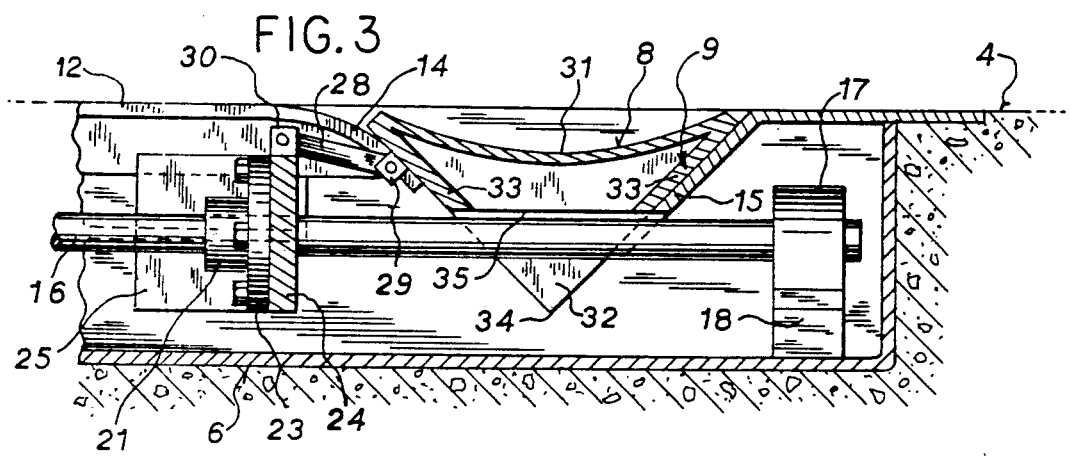
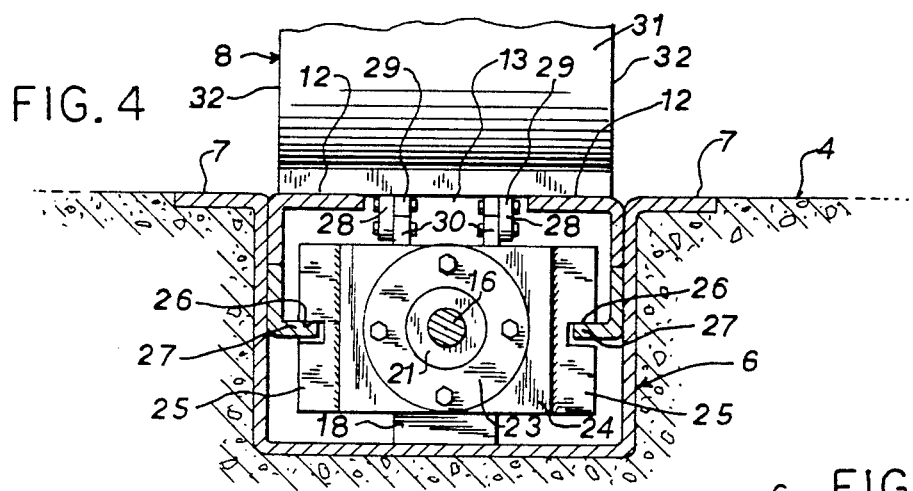
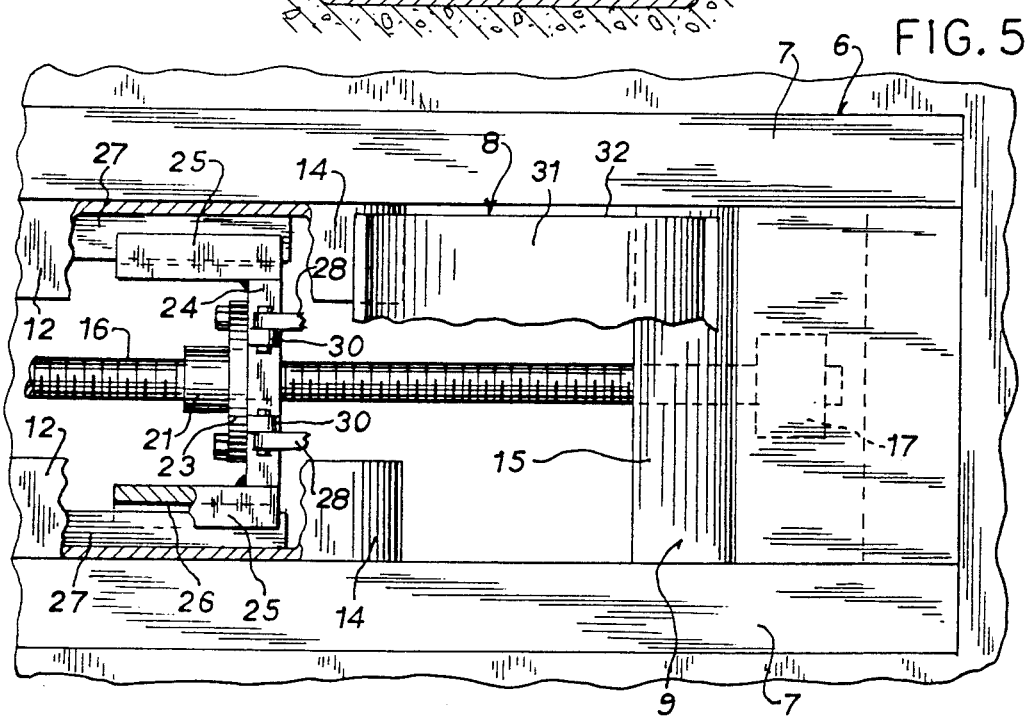

AUTOMATIC WHEEL CHOCKING APPARATUS HAVING AN IMPROVED DRIVE MECHANISM

BACKGROUND OF THE INVENTION

During a dock loading operation, cargo can be moved between a loading dock and a truck parked in front of the dock either manually or through use of material handling equipment, such as a fork lift truck. During the loading operation, the rear end of the truck, which is located against the dock, completely encloses the doorway in the dock so that the loading operation is not visible to the truck driver. Consequently, there have been instances when a truck driver, thinking that the loading operation has been completed, has pulled away from dock with the result that personnel or material handling equipment could be injured or damaged.

Various types of devices have been used in the past to prevent a truck from pulling away from a loading dock during a loading operation. The most common type of restraining device is a wheel chock in which chocks are manually placed behind the wheels on the truck. However, wheel chocks are frequently lost or misplaced, and as a result, they are not available for use at the loading dock. In other situations, the dock attendant or truck driver may be negligent in manually positioning the wheel chocks.

As a result of the problems associated with manual wheel chocks, automatic truck restraining devices have been proposed. One common form of truck restraint is one that is either mounted on the front face of the loading dock or on the driveway in front of the dock face and is employed to engage the ICC bar at the rear end of the truck. An ICC bar is a structural bar or beam that is located at the rear end of the truck, below the truck bed, to prevent automobiles from under-riding the truck in the event of a rear end collision. Truck restraints of this type generally include either a hook or a blocking member which is automatically actuated through controls on the loading dock to engage the ICC bar, or to move to a blocking position outwardly of the ICC bar, to prevent accidental movement of the truck away from the loading dock.

The conventional truck restraint is a complicated mechanism due to the fact that the truck restraint must be able to accommodate various types of trucks and various configurations of ICC bars. More particularly, ICC bars can vary from about 12 inches to 30 inches above the ground and the truck restraint must be able to engage the ICC bar at all of the working levels. Further, during a loading or unloading operation, the truck bed will tend to float. For example, as cargo is removed from the truck bed, the truck springs will relax with the result that the truck bed will float upwardly. Conversely, as cargo is applied to the truck bed, the truck bed will float downwardly. Consequently, the truck restraint must be able to accommodate float of several inches and still maintain engagement with the ICC bar.

U.S. Pat. No. 4,969,792 describes a further type of truck restraining device which takes the form of an automatic wheel chocking mechanism. In this patent, a pair of parallel troughs are formed in a support platform which is mounted for pivoting movement within a pit formed in the driveway in front of the loading dock. A wheel chock is mounted for movement within each trough between a recessed position, where the chock is located beneath the upper surface of the platform, to an operative or chocking position, where the chock will engage the truck wheel to prevent the truck from moving away from the loading dock.

As described in the aforementioned patent, the wheel chocks are moved between the recessed and operative position by a cylinder-piston arrangement in which the piston is fixed to the platform and the cylinder is movable relative to the piston and carries a chain which is interconnected with the wheel chock. With this construction, extension of the cylinder-piston unit will move the wheel chock from its recessed or storage position to the operative or chocking position.

The use of a cylinder-piston unit has certain disadvantages in that the reciprocating path of movement of the wheel chock is limited to the stroke of the cylinder. Therefore, the construction in the aforementioned patent incorporates a chain drive mechanism with the cylinder in order to increase the path of travel of the wheel chock over the stroke of the cylinder-piston.

The use of a cylinder-piston unit also requires that hydraulic pressure be continuously maintained in the cylinder when the wheel chock is in the operative or chocking position. This continuous application of hydraulic pressure over extended periods can result in wear on the hydraulic system and possible leakage of hydraulic fluid.

SUMMARY OF THE INVENTION

The invention is directed to an improved automatic chocking apparatus which is adapted to restrain movement of a truck or other vehicle away from a loading dock during a loading operation.

In accordance with the invention, the driveway or supporting surface, which extends outwardly from the vertical face of the loading dock, is provided with an elongated trough, and a wheel chock is mounted for movement in the trough between a recessed or storage position, where the chock is located beneath the level of the supporting surface, and a chocking or operative position where the chock is located above the level of the supporting surface and is adapted to engage the wheel of a vehicle to prevent movement of the vehicle away from the dock face.

The wheel chock is moved between the storage and operative positions by a drive mechanism that is located within the trough. The drive mechanism includes a rotatable lead screw, and a nut is threaded on the screw and is pivotally connected to the wheel chock via a rigid link. Rotation of the lead screw will cause the nut to move axially on the screw to thereby move the wheel chock between the storage and operative positions.

The wheel chocking mechanism of the invention is of simple mechanical construction, and as a further advantage, the apparatus of the invention can be driven by an electric motor or hydraulic motor, whichever provides the best overall economies of production and use. Moreover, by proper selection of motor speeds and design of the threads on the lead screw, the desired speed of travel of the wheel chock can be obtained without the necessity of incorporating a speed reducing transmission. In addition, through design of the lead screw, the drive mechanism can be self locking so that it will not be back driven by the force of the truck wheels acting against the wheel chock.

Other objects and advantages will appear during the course of the following description.

DESCRIPTION OF THE DRAWINGS

The drawings illustrate the best mode presently contemplated of carrying out the invention.

In the drawings:

FIG. 3 is a fragmentary enlarged vertical section showing the wheel chock in the storage position.

FIG. 4 is a transverse section of the mechanism with the wheel chock being in the chocking position.

FIG. 5 is a top view of the construction shown in FIG. 3.

DESCRIPTION OF THE ILLUSTRATED EMBODIMENT

Figure 1:
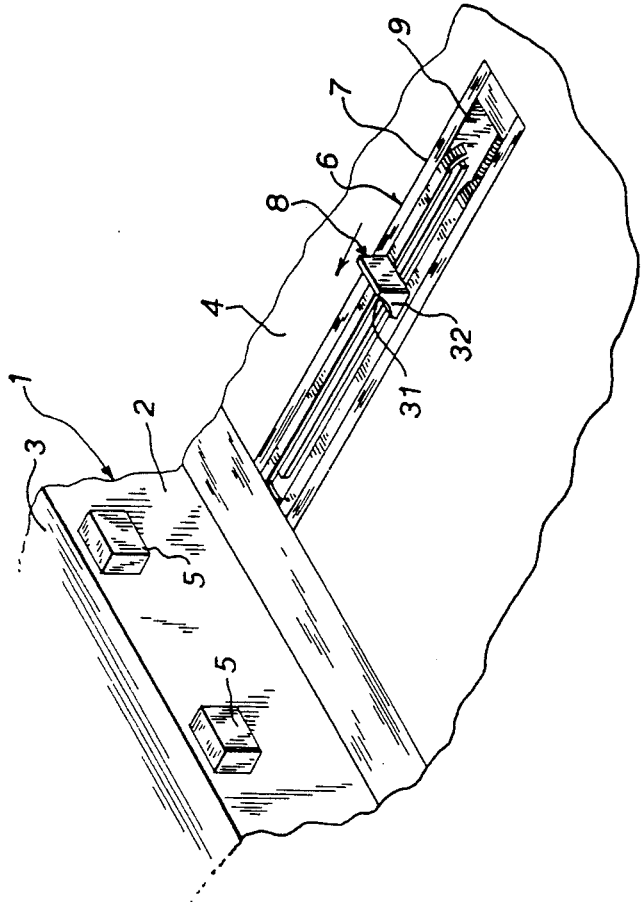
FIG. 1 is a schematic perspective view of a loading dock incorporating the automatic wheel chocking mechanism of the invention.

The drawings illustrate an automatic wheel chocking mechanism for restraining outward movement of a truck or other vehicle away from a loading dock during a loading operation. As best shown in FIG. 1, loading dock 1 is provided with a vertical front face 2 and an upper horizontal surface 3. A driveway or other supporting surface 4 extends outwardly from front face 2.

A pair of bumpers 5 can be attached to the front face 2 of dock 1 in a location to be engaged by the rear end of a truck as it backs toward the loading dock for a loading operation.

In accordance with the invention, a parallel, elongated, open-top metal trough 6 is embedded in driveway 4. The trough 6 is generally U-shape in cross-sectional configuration and is provided with side flanges 7 which extend outwardly and are generally flush with the upper surface of driveway 4.

A wheel chock 8 is mounted for movement within the trough 6 and can be moved between a storage or recessed position in which the wheel chock is located in a pocket 9 beneath the level of driveway 4, and a chocking or operative position in which the chock is located above the surface of the driveway and is engaged with the outboard side of a wheel 10 of a truck or other vehicle 11.

As best shown in FIG. 4, an angle-shaped guide plate 12 is attached to each sidewall of trough 6 and the adjacent upper edges of the guides are spaced apart to provide a longitudinal gap or space 13, as seen in FIG. 4. Guides 12 are formed with downwardly inclined ends 14 that border the inboard end of pocket 9, as shown in FIG. 3. The inclined ends 14 aid in guiding the wheel chock 8 in movement from the storage position to the operative position.

As shown in FIG. 3, pocket 9 is provided with a diagonal or sloping end surface 15 which supports the wheel chock when in the storage position.

Wheel chock 8 is moved between the storage and operative positions by a drive mechanism which is located within the trough 6. The drive mechanism includes a threaded lead screw 16 which is journaled for rotation within bearings 17 that are mounted on supports 18. Supports 18 extend upwardly from the bottom wall of trough 6. As illustrated in FIG. 3, lead screw 16 extends beneath surface 15 of pocket 9.

A power source, which as illustrated, is in the form of a reversible electric motor 19, is connected to one end of lead screw 16 by a coupling 20. Alternately, it is contemplated that a hydraulic motor can also be used in place of the electric motor 19.

Threaded on lead screw 16 is a nut 21 and nut 21 is provided with an outwardly extending annular flange 23 which is bolted to a cross plate 24. Lead screw 16 extends through an opening in plate 24. The side edges of cross plate 24 carry slide plates 25 having longitudinal grooves 26 which are engaged with angle guides 27 that are mounted on the side walls of trough 6, as best seen in FIG. 4. The engagement of grooves 26 with guides 27 serves to guide nut 21 in movement within trough 6 to prevent deflection of the lead screw 16 and rotation of the nut 21.

Figure 2:
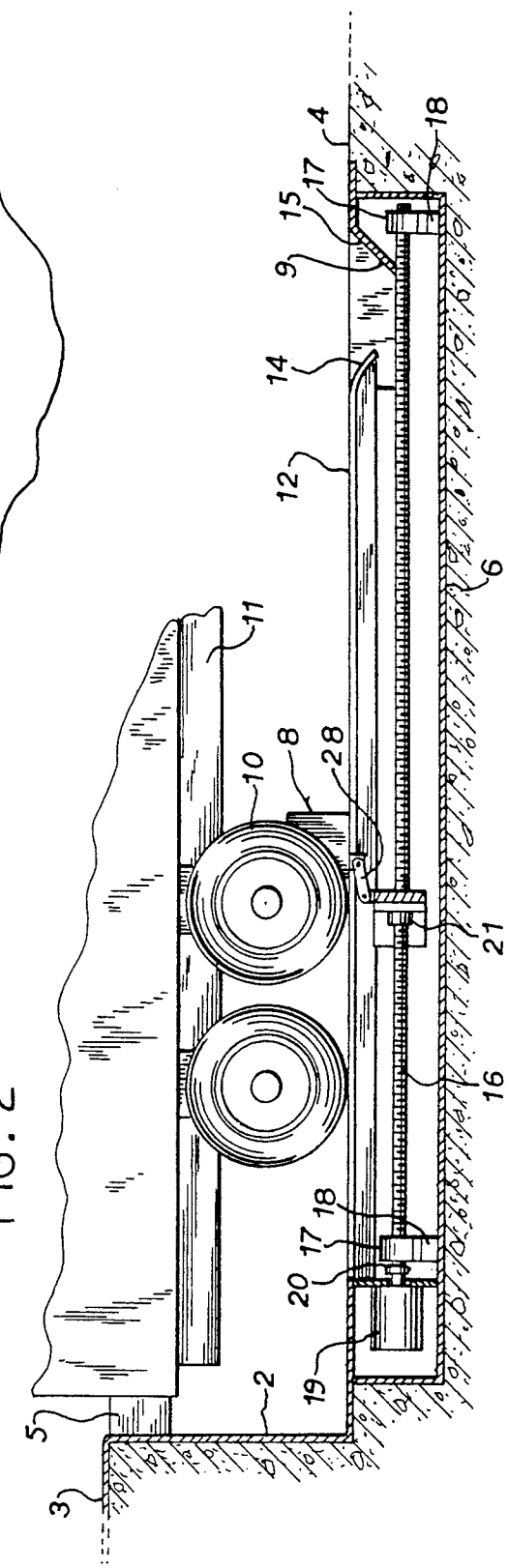
FIG. 2 is a vertical section of the wheel chocking mechanism.

Nut 21 is operably connected to wheel chock 8 through a pair of rigid links 28. One end of each link 28 is pivotally connected to lugs 29 on wheel chock 8, while the opposite end of each link is pivotally connected to a lug 30 that projects upwardly from cross plate 24 which is secured to nut 21. With this construction, rotation of the lead screw 16 in one direction will move the nut 21 axially along the screw and will correspondingly move the wheel chock 8 from its storage position to its operative position where the chock will engage the wheel 10, as illustrated in FIG. 2. Rotation of the lead screw 16 in the opposite direction will move the wheel chock 8 from the chocking position back to the storage position where it will not interfere with movement of the truck away from the loading dock.

Wheel chock 8 includes a generally concave chocking surface 31 which is adapted to engage the wheel 10 of the truck, a pair of parallel side surfaces 32 and a pair of end surfaces 33. As shown in FIG. 3, the end surfaces terminate short of the apexes 34 of the side surfaces to provide a recess 35 that allows clearance for the lead screw 16 when the chock is in the storage position, as shown in FIG. 3.

The wheel chocking mechanism of the invention is of simple construction, having relatively few moving components. Further, the nut 21 can be directly attached to the wheel chock 8 via links 28 and without the necessity of any complicated intermediate connecting mechanism.

Through proper selection of motor speeds and design of the lead screw 16, the desired speed of travel of wheel chock 8 can be obtained without the use of a speed reducing transmission. The lead screw 16 can be designed to be self-locking so that the nut cannot be back-driven by the force of the vehicle wheel acting against the chock.

Various modes of carrying out the invention are contemplated as being within the scope of the following claims particularly pointing out and distinctly claiming the subject matter which is regarded as the invention.

We claim:

1. An automatic wheel chocking apparatus, comprising a generally horizontal supporting surface having a pocket therein, a wheel chock mounted on said supporting surface for movement from a storage position where said wheel chock is located within said pocket and beneath the level of said supporting surface to an operative position where said wheel chock is located within said pocket and beneath the level of said supporting surface to an operative position where said wheel chock is located above said supporting position and is disposed to engage a wheel of a vehicle, drive means for moving said wheel chock between the storage and operative positions and comprising a rotatable lead screw, a nut engaged with said lead screw, means for rotating said screw to thereby move said nut axially on said screw, and link means having a first end pivotally connected to said nut and having a second end pivotally connected to said wheel chock, wherein rotation of said screw in one direction moves said wheel chock from the storage position to the operative position and rotation of the lead screw in the opposite direction moves said wheel chock from the operative position to the storage position.

2. The apparatus of claim 1, wherein said wheel chock includes a generally concave chocking surface, and a second surface disposed to ride on said supporting surface as said wheel chock is moved between the storage position and the operative position, said link means being pivotally connected to said second surface.

3. The apparatus of claim 1, and including guide means interconnecting said supporting surface and said nut for guiding the nut in movement.

4. The apparatus of claim 1, wherein said supporting surface include an elongated trough, said pocket disposed in said trough and said drive means being disposed in said trough.

5. The apparatus of claim 4, wherein said wheel chock is provided with a recess to receive said lead screw when said wheel chock is in the storage position.

6. The apparatus of claim 1, wherein said wheel chock includes a generally curved chocking surface disposed to engage the wheel of the vehicle and a second surface disposed to ride on the supporting structure as the wheel chock is moved between the storage position and the operative position, the first end of said link means being pivotally connected to an upper portion of said nut and the second end of said link means being pivotally connected to said second surface.

7. In combination, a loading dock having a vertical dock face and a vehicle supporting surface extending outwardly from said dock face, an elongated trough disposed in said supporting surface and extending outwardly from said dock face, a wheel chock mounted for movement relative to said supporting surface between a storage position where said wheel chock is located within said trough and will not obstruct movement of a vehicle on said supporting surface and an operative position where said wheel chock extends upwardly above said trough and is disposed to engage a wheel of a vehicle to prevent movement of said vehicle away from said dock face, and reversible drive means disposed within said trough for moving said wheel chock between the storage and operative positions, said drive means comprising a lead screw, journaling means for mounting said screw for rotation, power means disposed within the trough and operably connected to said screw for rotating said screw, a nut engaged with said screw and disposed to move axially of said screw in accordance with rotation thereof, a link having a first end pivotally connected to said nut and having a second end pivotally connected to said wheel chock, and guide means for guiding the nut in axial movement, said guide means including a first guide element associated with said trough and a second guide element connected to said nut and engaged with said first guide element.

8. The combination of claim 7, wherein said wheel chock includes a generally concave chocking surface adapted to engage the wheel of the vehicle, and a second surface disposed to ride on said supporting surface as said wheel chock is moved to the operative position, said link being pivotally connected to said second surface.

9. The combination of claim 7, wherein said wheel chock is provided with a recess to receive said lead screw when said wheel chock is in the storage position.

10. The combination of claim 7, and including a pocket disposed in said trough to receive said wheel chock when said chock is in the storage position, said pocket including an inclined wall bordering an end of said pocket to support said wheel chock when said wheel chock is in the storage pattern.

11. The combination of claim 7, and including a guide member on each side of said trough and disposed substantially flush with said supporting surface, said guide members having facing longitudinal edges spaced apart to provide a gap, said link extending through said gap.

12. The apparatus of claim 11, wherein an end of each guide member located adjacent said pocket is sloped downwardly to provide an inclined ramp on which said wheel chock rides as said chock moves between the storage and operative positions.

13. The apparatus of claim 7, wherein said power means comprises a motor having a drive shaft coupled to said lead screw.

14. The apparatus of claim 10, wherein said inclined wall is provided with an opening to receive said lead screw.

* * * * *